No. 826,155. PATENTED JULY 17, 1906.
D. DUDLEY.
HOUSE TO HOUSE TELESCOPE SYSTEM.
APPLICATION FILED MAY 22, 1905.
4 SHEETS—SHEET 4.
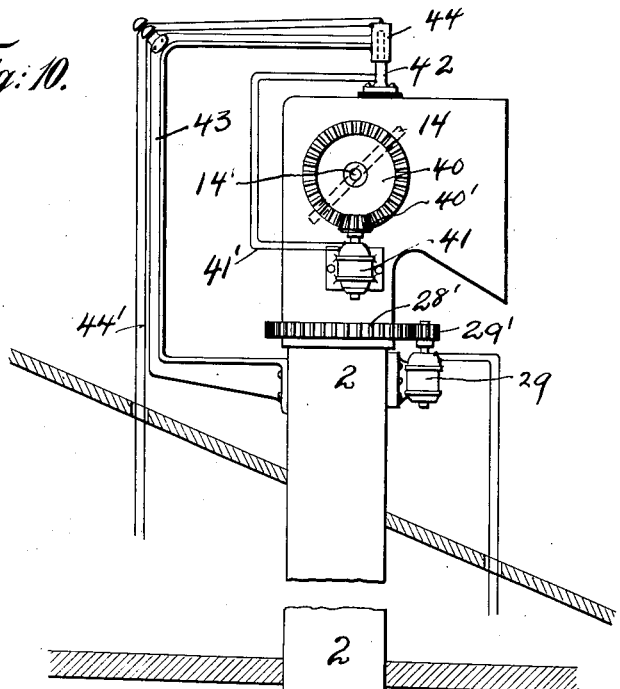
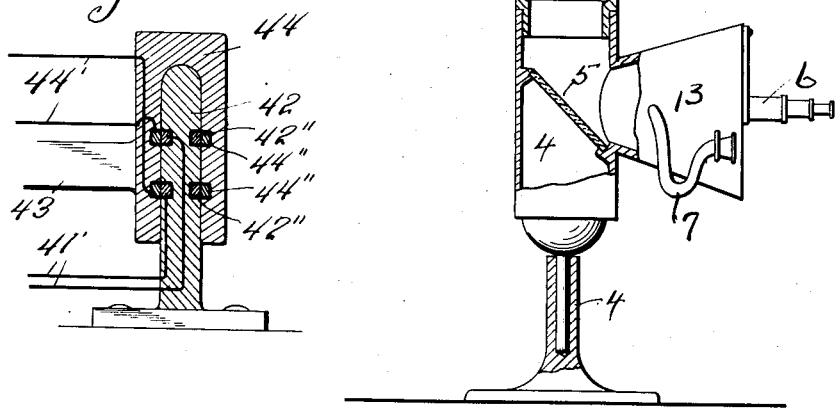
WITNESSES:
Max B. A. Doring
J. A. Vernon
Dana Dudley INVENTOR
BY
Henry Gough
his ATTORNEYS

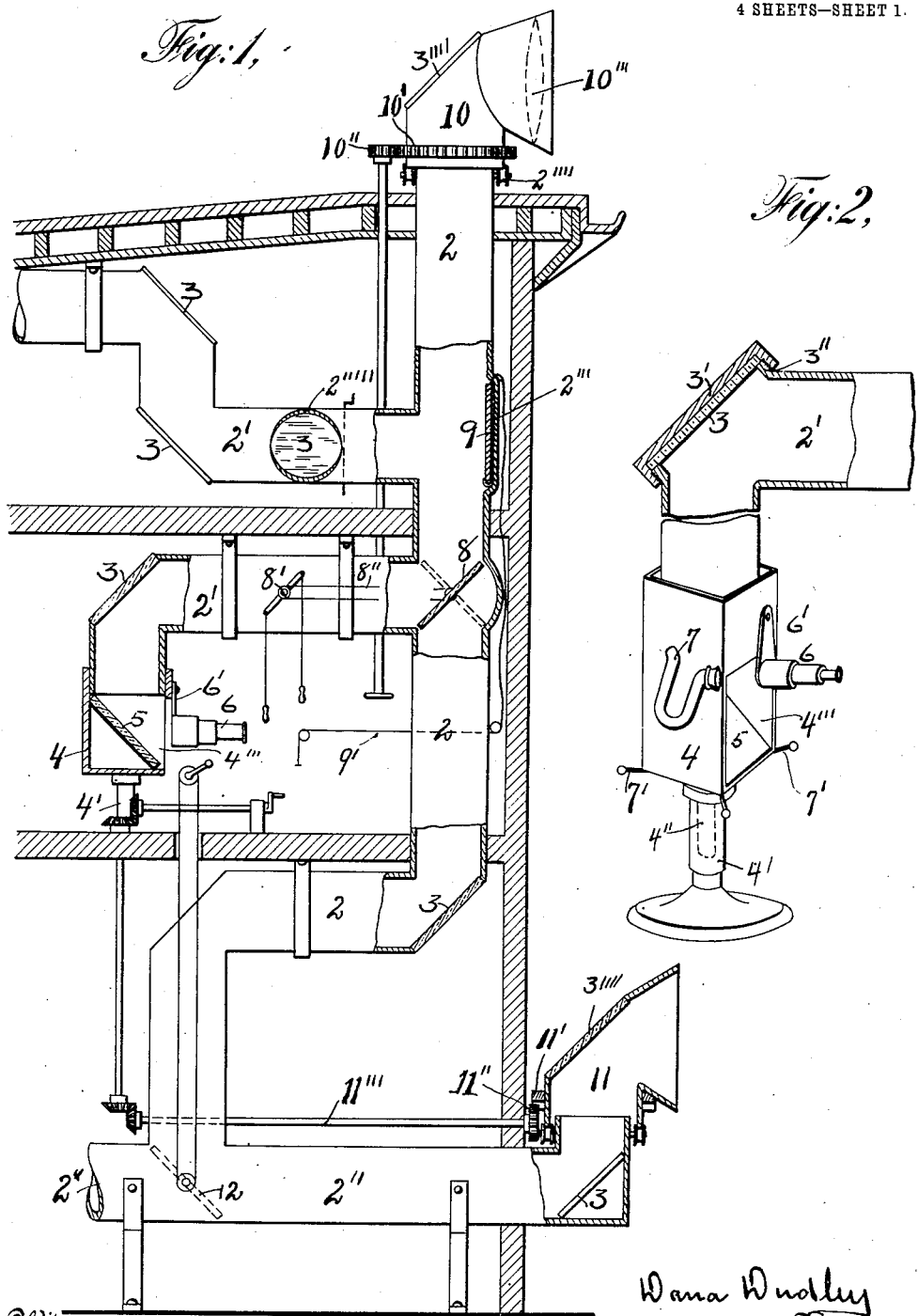

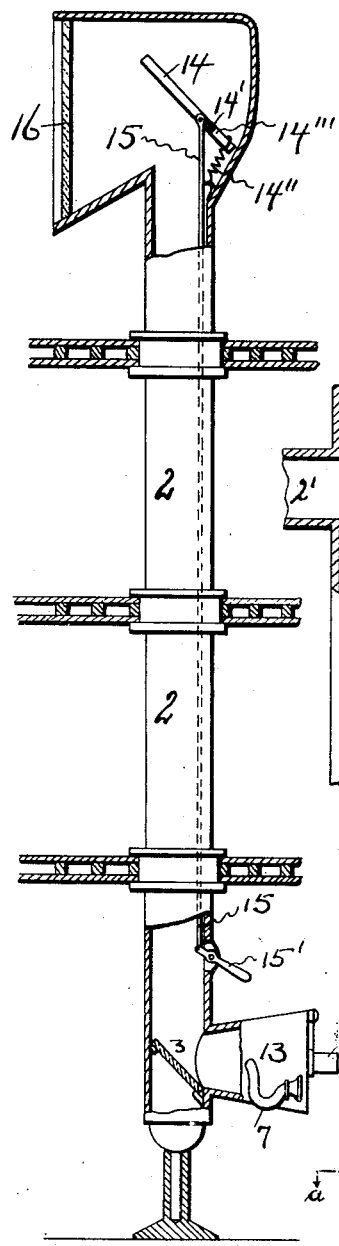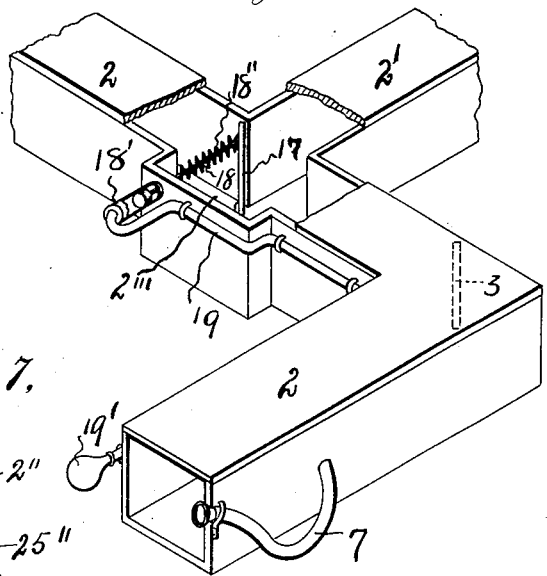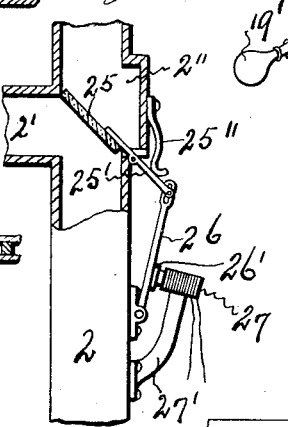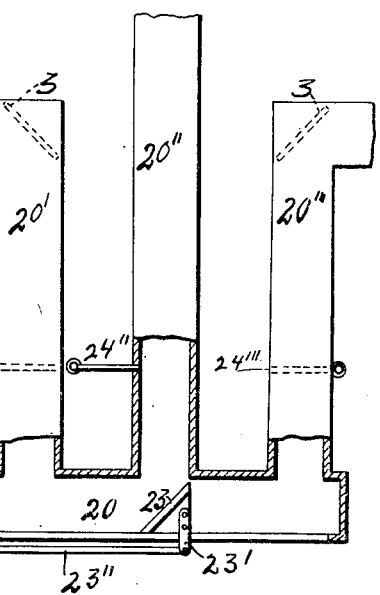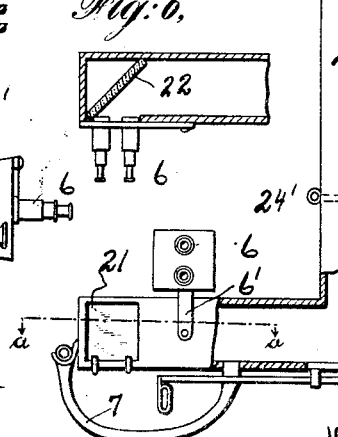

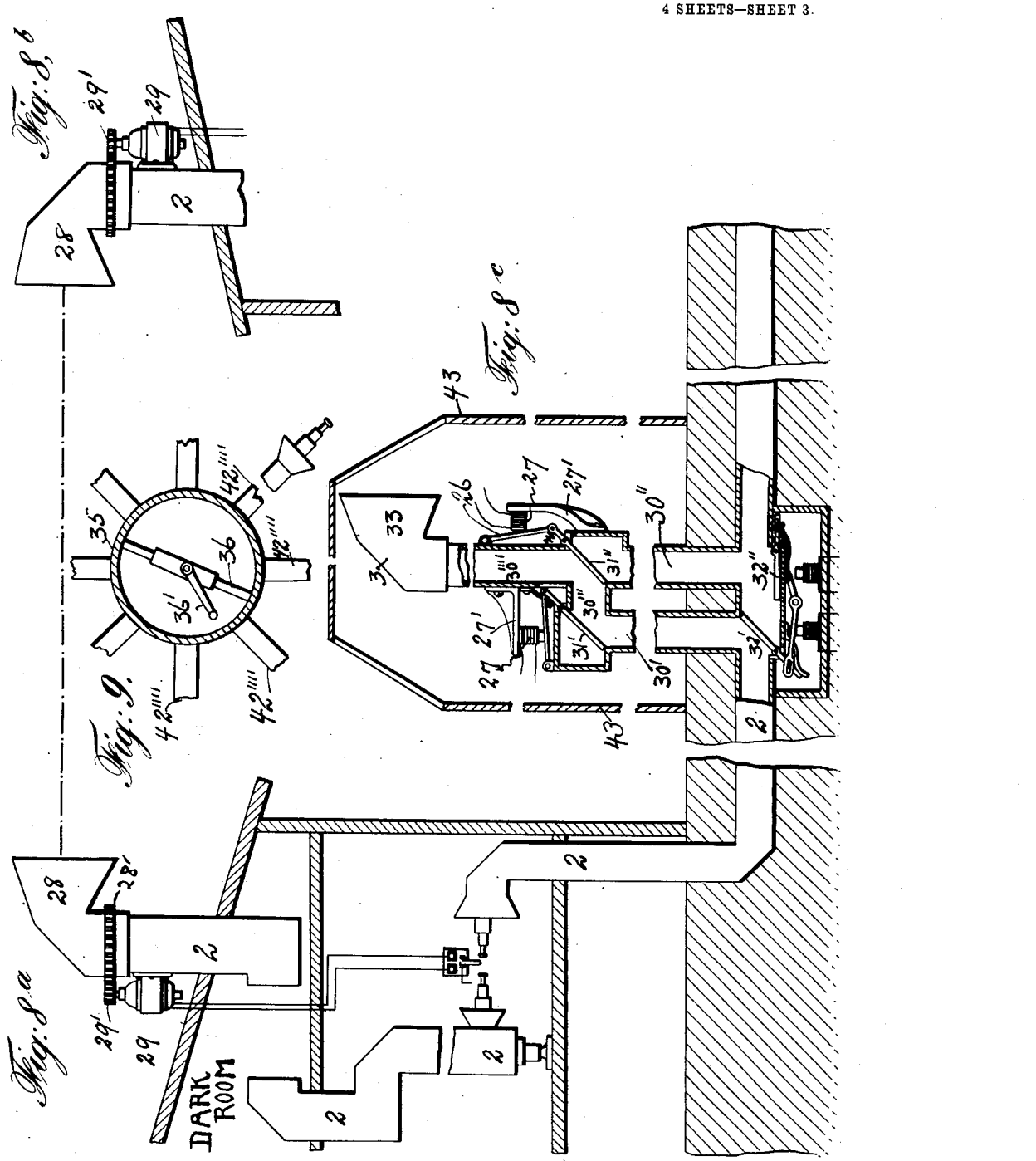

UNITED STATES PATENT OFFICE.

DANA DUDLEY, OF WAKEFIELD, MASSACHUSETTS.

HOUSE-TO-HOUSE TELESCOPE SYSTEM.

No. 826,155.  Specification of Letters Patent.  Patented July 17, 1906.

Application filed May 22, 1905. Serial No. 261,608.

*To all whom it may concern:*

Be it known that I, DANA DUDLEY, a citizen of the United States, residing at Wakefield, in the county of Middlesex and State of Massachusetts, have invented certain new and useful Improvements in House-to-House Telescope Systems, of which the following is a specification.

My invention relates to means whereby sight communication may be established between separate apartments in the same house or between separate houses, as aural communication is to-day through the instrumentality of the telephone and telegraph, and more particularly the invention has relation to a system embodying main tubes or pipes, branch tubes proceeding from the main tubes at angles thereto, mirrors for reflecting the rays of light from one tube to the other, means for shifting the mirrors and therefore the line of vision, telescopic eyepieces and object-glasses mounted at suitable places on the tubes, and a movable hood whereby the field of vision may be altered at will, and a central-office system by which any visual tube may be connected to any one of a number of other tubes entering the central office.

The object of my invention is to provide a building or other structure with visual tubes having mirrors at the angles thereof, whereby a person present at the opening of one tube may be seen by a person at an opening at the end or farther along said tube, or a person located in one part of a building may see what is going on in another part of the same building or in some building with which the tube is in visual connection.

My invention consists in the details of construction and arrangement of parts, as set forth in the claims appended hereto.

In the drawings, Figure 1 is a vertical section of a building provided with a tube system, part of the tubes and certain connections being shown in section. Fig. 2 is an enlarged detail, partly in perspective, of the revolving transmitting or receiving chamber, such as is used at a terminal station. Fig. 3 is a vertical section of a building, showing a modified form of hood which is specially adapted for certain classes of work. Fig. 4 is a detail perspective, partly in section, of a pneumatic switch for operating a mirror to connect a main tube with a branch. Fig. 5 is a face view, partly sectional, of a simple form of "central-office" connection. Fig. 6 is a section on line *a a*, Fig. 5. Fig. 7 is a section of a main and branch tube, an electrical mirror-switch being shown in elevation. Fig. 8ª is a vertical section of a building provided with my system slightly modified. Fig. 8ᵇ is a like section of the upper part of another building having a telescope system and movable hood in visual connection with the telescopic tube system of the building shown in Fig. 8ª. Fig. 8ᶜ shows an arrangement of electrical switches and branch tubes necessary in order to get a view in either direction along a main line, the same being shown in connection with an underground conduit leading from building shown in Fig. 8ª. Fig. 9 is a top view, partly sectional, of a central-office switch. Fig. 10 is an elevation, partly sectional, of modification of Fig. 3, one of my tubes having a rotatable hood, a vertically-shiftable mirror, and an independently-rotatable transmitting or receiving chamber. Fig. 11 is an enlarged detail upper end of Fig. 10, the pin and sleeve fitting thereon being in section to show the wiring.

Like numerals in the several figures designate like parts.

In Fig. 1 is illustrated the simplest form of my invention. Therein 2 designates what may be termed a "main tube," though this term is partly relative, as all tubes are preferably of the same diameter. 2 2' designate branch tubes leading off from the main tube and to various parts of the building. It will be understood, of course, that I have only shown so much of a building as will illustrate the principle and operation of my invention and also that in order to clearly illustrate the same the telescopic tubes are shown of a size out of proportion to the size of the rooms.

The main tube and its branches are designed to be carried in any directions and at any angles through the rooms of a house and to project into the open air or to run underground.

At the joint of two connecting-tubes I provide mirrors of glass, metal, liquid, or other reflecting material, set at a suitable angle to transmit the view. Where the angle between one tube and another is permanent, as where a tube is bent at an angle in order to go around some projection of the wall, or to change its direction, as where it enters a floor or ceiling or passes under a street, I provide the tube with a mirror 3, set at a permanent angle, the angle being such that the angle it makes with the axis of the tube is equal to the angle it makes with the other tube. This may be accomplished by forming the tubes as shown in Fig. 2, where 3 is the oval mirror necessary in this form, set on the angularly-cut end of the pipe and covered with a cap 3', screwing on to the flanges 3''. I may, however, set this mirror in any manner desired.

At the terminal of a tube I preferably provide some form of receiver or transmitter, such as that shown in Fig. 2, whereby the image projected along the pipes may be received or transmitted in a horizontal plane conveniently to the eyes of an observer. As I have shown the receiver in Figs. 1 and 2 it consists of a square or round casing 4, mounted to rotate on a standard 4', as by a shaft 4'' (shown in dotted line) entering said standard. Within the casing 4 is the mirror 5, set at a suitable angle to receive the image reflected down the tube and to reflect it out through the opening 4''' of the box or to receive the image of anything in front of said opening and reflect it upward through the tube 2'. While it is not necessary for short distances, I prefer to mount a telescope or spy-glass 6 either a single glass, as shown in Fig. 2, or a binocular, as indicated in Fig. 6, in front of the opening 4'''. A convenient manner of mounting is to have the glass supported on a pivoted arm 6', whereby it may be swung into position. It is to be noted that in Fig. 2 the telescope does not fill the opening 4''' and that it is located at the upper corner of the opening that it shall obstruct the opening as little as possible. This is so that the figure of any one standing in front of the receiver may be concealed as little as possible and a perfect image reflected up the pipe. The receiver box or case is also intended to be provided with voice-transmitting apparatus, either a telephone transmitter and receiver attached thereto, the wires of which may pass through and along the pipes 2 2', or, as I show it in the figures, a speaking-tube 7, having a flexible end. This tube 7 merely enters into the tubes 2 2', which will then carry the sound of themselves. The rotatable receiver 4 may also be provided with handles 7', whereby it may be moved. The object of this rotation of the receiver will be later described.

Where it is desired that from a central point, as an office-room, it shall be possible to look along the main tube in either one of two directions, I provide at the intersection of the tubes a pivoted mirror 8. This in Fig. 1 is shown as a mirror pivoted at its middle, so that its reflecting-face may be turned in an arc of ninety degrees. As this mirror 8 may be some distance away from the receiver 4, there should be some means provided whereby it may be actuated. A large variety of mechanisms might be used to turn this mirror. I have shown, however, an ordinary spindle 8', provided with projecting arms from which depend pull-cords. On the spindle 8' is a belt 8'', which passes over a spindle on the axis or pivot of the mirror. As this mechanism is well known and its operation evident, I have not considered it necessary to do more than indicate it diagrammatically. It will be seen that with the mirror 8 in the position shown in Fig. 1 an image will be reflected from above to the mirror, then along the branch tube 2' to the mirror 3, and thence downward to the mirror 5 in the receiver 4 and out to the observer, or that, vice versa, the image projected through the opening of case 4 will be reflected to mirror 8 and then upward along the pipe 2. If the mirror is turned as shown in the dotted lines, the reflection will be transmitted through the downwardly-extending portion of the main tube.

When it is desired that the reflected image shall be projected either along the main tube or to a branch tube, I provide the main tube at the intersection with a mirror, pivoted or otherwise arranged so as to either be moved to leave the main tube clear or to be moved into the main tube at an angle thereto, so as to reflect the image into the branch tube. Such a mirror I have shown at 9, Fig. 1. This is pivoted at one side in any suitable manner to the wall of a recess 2''', so that in one position it will fall at an angle across the tube 2 and at another it will be raised up within the recess 2''', so as to leave the main tube clear. Any mechanism may be used for turning the mirror on its pivot. I have shown a cord 9', which passes down to and is carried into the office by pulleys. In this case and as the mirror is normally across the tube I design to use the weight of the mirror to move it to its transverse position, pulling it up to the position shown in the figure by the said cord.

As I have indicated at 2'''''' in Fig. 1, there may be branch tubes projecting out from other tubes at an angle in a horizontal plane, and it is to be understood that the tube system may ramify in all directions, as desired, it only being necessary that at each junction a pivoted or otherwise movable mirror be placed.

In Fig. 1 I show the main tube projecting upward and through the roof of the building. At its exit end such a projecting tube is provided with a rotatable hood 10, having an angled mirror 3'''', the hood being rotated by any suitable mechanism—as, for instance, such mechanism as is shown in Fig. 1, wherein the hood is supported on rollers 2'''' and is provided with a rack 10', gearing with a pinion 10'', mounted on a shaft which extends downward into the office. By turning the shaft the hood may be rotated in a complete circle, thus sweeping the horizon in all directions. The opening of the hood may be provided with a lens 10''', if desired.

I have shown in Fig. 1 the main tube extended downwardly to a lower floor and there connected with a branch tube 2'', extending to the right and left, the right extension of the branch projecting out through the building and being provided with a rotatable hood 11 of practically the same construction as before described. 11' is a rack; 11", a pinion which is on a shaft 11''', operated by bevel-gears from the office. By turning this hood the view may be taken from any direction. At the junction of the tubes last referred to I show a mirror 12 of the same character as the pivoted mirror 8 before described.

It is in connection with the pivoted hoods 10 or 11' that it is necessary to use a rotatable receiver 4 in order that the receiver may be rotated in correspondence with the hood. Otherwise were the hood rotatable and the receiver fixed the image reflected on the mirror 5 would be reversed, except at those times where the hood happened to be turned in the same direction as the receiver.

The operation of the construction so far described is evident. A person in the main office wishes to see what is going on in another room or on another floor—as, for instance, the upper floor of Fig. 1. He pulls the cords which rotate the mirror 8 to the position shown in full lines. The mirror 9 will normally lie across the tube 2. The view of the upper floor will then be received at the opening of the branch tube and transmitted along the branch tube, being reflected by the angled mirrors at every bend. At the main tube it is reflected downward by the mirror 9 to the mirror 8, which reflects it into the branch tube, and so to the mirror 5 of the receiver 4. An observer at the receiver is thus enabled by proper adjustment of the mirrors to see either into any of the rooms of the building at the street or ground level to the outside of the building at or above the roof-level or by a system of connected tubes operating in the same manner to and into a building at a distance. By manipulating the hood and by using the telescopic eyepiece he is able while sitting at the receiver in the office to observe objects at a great distance, or, as indicated in Figs. 8ª and 8ᵇ, by alining the hood with a corresponding hood on another building to communicate visually between one building and another through the air. In the construction I have shown two persons at opposite terminals of my tube system can talk with each other by means of the telephone or speaking-tubes and at the same time be entirely visible to each other. The tubes I use are from three inches to a foot in diameter and are either round or square, though I prefer the former for housework.

While I have in Fig. 1 shown the mirror 3'''' as fixed, there are many circumstances wherein I prefer to use a mirror capable of adjustment in a vertical as well as a horizontal plane. A convenient and simple arrangement for this purpose is illustrated in Fig. 3, which is more especially designed for a fire and signal-receiving tower. In this figure the main tube 2 is rotatable upon the base and has at its lower end the mirror 3, the tube having an opening opposite the mirror provided with flared sides 13. It is obvious, however, that other forms of receiver could be used. I have merely shown this form to illustrate a modification over that in Fig. 1. It is for this same reason that I show the whole tube as rotatable and the head as fixed thereon. The tube might be fixed and carry a rotatable receiver and hood without interfering with the operation of the shifting mirror, as shown in Fig. 10. The hood-mirror 14 is pivoted to a transverse shaft 14', and a spring 14", engaging with an arm 14''', normally tends to hold it in a vertical position. A rod 15 is, however, connected to the mirror-frame and passes down the tube to a suitable handle 15', located conveniently to the hand of the observer at the receiver 13. By moving the handle the mirror is rotated in a vertical plane on its pivot 14'. I have shown a simple means of operating the mirrors; but it is obvious that many other mechanisms could be used for this purpose, either electrical or mechanical.

In Fig. 3 I show a pane of glass 16, set into the mouth of the hood. This I design to use on all hoods as a protection to the inclosed mirror from rain, snow, or dirt or from the entrance of birds.

In the construction shown in Fig. 10 the hood is mounted to rotate on a fixed tube 2 after the manner shown in Fig. 1. At the terminal end of the tube 2 is the receiver consisting of a casing 4, mounted to rotate on a suitable standard 4' in the manner of the casing 4 (shown in Fig. 2) or in any other suitable way. Within the casing is the mirror 5 for reflecting the image received on it out through the opening in the receiver. This opening I have shown as provided with the flared sides and auxiliary connections shown in Fig. 3. The hood is rotated by means of a rack and pinion, such as shown in Fig. 1; but the rack 28' is rotated by a pinion 29' on the shaft of an electric motor 29, such as is shown in Figs. 8ª and 8ᵇ. For rotating the mirror 14 in a vertical plane I pivot the mirror on a shaft 14', which carries a bevel-gear 40. An electric motor 41 drives a pinion 40', which rotates said mirror to any degree desired. While for purposes of illustration I have shown the pinion 40' as comparatively large in proportion to the bevel-gear 40, it is to be understood that in practice it is very small. It will be also understood that any of the many well-known forms of intermediate reducing-gears may be used for the purpose of decreasing the proportionate movements of the two gears. The motor 41 may be connected up to any suitable source of energy in any manner desired. There are many ways of doing this, which will be evident to any one skilled in the art; but one means thereof I have shown in Figs. 10 and 11. Insulated wires 41' 41' from the motor are carried up to and into a vertical pin 42, placed at the center of rotation of the hood. The wires 41' are carried up in this pin insulated from each other and connect at their ends each one to a ring 42''. These rings are insulated from the body of the pin, and the edges thereof are flush with the outer surface of the pin. A bracket-arm 43 is mounted in any suitable manner to project over the top of the hood and carries a sleeve or thimble 44. This sleeve fits over the pin 42, and the pin is designed to rotate within the sleeve. Set in alinement with the rings 42'' are contact-rings 44'' 44'', insulated from the body of the sleeve and each connected to a wire 44', which runs from each ring to the source of energy and to such ordinary switches as may be used for making or breaking the circuit to the motor to start or stop it. It is obvious that there may be other arrangements working on this same principle without departing from my invention.

Fig. 4 shows in perspective a pneumatic switch to be used for switching a mirror from one position to another in place of the arrangement shown at 9 in Fig. 1. In this form the mirror 17 is pivoted at one end in a recess 2''' of a tube 2 and has at its other end at the terminal station a piston-rod 18, whose piston is received within a cylinder 18'. This cylinder is connected by a small pipe 19 to a compression-bulb 19'. A tension-spring 18'' surrounds the piston-rod and holds the mirror normally closed into the recess. By compressing the bulb at the terminal station the piston is forced out and the mirror 18 thrown to the position shown in Fig. 4 and usual connection made with the branch tube.

In Fig. 7 I show the preferable form of mirror-switch actuated by electricity, and therefore capable of being operated at a great distance from the central office or terminal station. It is this switch which I particularly use for subway construction. In it the mirror 25 is attached to an arm 25', pivoted to the wall of the usual tube-recess 2'''. One end of the recess is slotted for the passage of the arm which extends outward and has a pivoted connection with the slotted end of a lever 26, which at its other end is pivoted to a fixed support, as the wall of the tube. On the lever is an armature 26' in such a position that it is drawn to the magnet when the current flows through the magnet-wires. When the current ceases, a spring 25'' forces the levers inward against the side of the tube 2 and raises the mirror to its normal position, leaving the main-line tube clear.

Fig. 5 shows a form of terminal switch for connecting an operating observer with any one of a number of tubes, each one a main tube or tube leading off to a separate section of the building. In the drawings I show three such tubes 20' 20'' 20''', all opening into a trunk-tube 20, which has at one end the sight-opening 21, behind which is the angled mirror 22. 23 is an angled mirror supported on a sliding block, which is adapted to be shifted along the trunk-tube 20 to a position opposite the opening of any one of the tubes 20' 20'' 20'''. In order to shift the mirror 23, I slot the floor of the trunk-tube. Through this slot projects a link 23', to which is connected a rod 23'', having a handle. 24' 24'' 24''' designate slides which are used to close off a tube not in use and prevent the entrance of light or sound into the trunk-tube except through the tube which is open.

In Figs. 8ᵃ and 8ᵇ I show two hoods 28 of the kind before described, which are revolved by an electric motor 29, placed in buildings at a distance from each other, the image of an observer at one terminal station being reflected up through the telescope-tubes of one building, out through the hood 28 thereof, and through the air to the corresponding hood of another station and by its tubes and mirrors to the terminal station in the other building. It is obvious that by calling up the second-named terminal station, as by a telephone or other signal, this airline connection could be easily made. I have shown an electric motor mounted to rotate the hood to illustrate that I contemplate the use of motors in place of the hand-actuated mechanism heretofore shown. The motors would be geared down so that the comparatively rapid rotation of the motor-shaft would be translated into a comparatively slow rotation of the hood. By reversing the motor the motion of the hood is reversed. I have shown the motor-shaft as having a pinion 29' gearing with the rack 28'.

In Fig. 8ᵃ the tube 2 is broken and a section left out. I contemplate doing this wherever it is convenient and a dark room can be used.

Fig. 8ᶜ shows an arrangement of tubes and mirrors such as is necessary in order that an observer may be connected with and look in either of two directions along a main tube. This could be accomplished by a mirror pivoted at the juncture of the axial lines to two tubes after the manner of the mirror 8 in Fig. 1, provided such mirror was two-faced; but such a mirror even when it was parallel to the line of the main tube would interfere somewhat with the view along said main tube. By the arrangement shown in Fig. 8ᶜ no obstruction is made to a view in two directions along the main line. The construction comprises two terminal-station tubes 30' 30'' at its upper end, the two mirrors moving in parallel arcs, the tubes 30' 30'' being connected by a cross-tube 30'''. These switches are preferably electric, such as are shown in Fig. 7. The mirror 31' might be a permanent mirror but that light might enter up tube 30' and be reflected through the tube 30''' into tube 30'' and interfere with clear sight through tube 30''''. At the lower ends of tubes 30' 30'' there are likewise two electrically-actuated mirrors 32' 32''. These are independent of each other and operate reversely, the mirror immediately beneath the tube 30' rotating from right to left when moving up into position, the mirror beneath tube 30'' moving from left to right. Each mirror is provided with the compound-lever system described heretofore in connection with Fig. 7. A main house-tube 30'''' forms a continuation of either tube 30' or 30'' and is intended to be connected with any system of ramifying house-tubes desired. In Fig. 8ᶜ the mirrors are switched to allow a view along tube 2 to the mirror 32', then up tube 30' to mirror 31', across the transverse connecting-tube 30''' to mirror 31'', then up to a terminal receiver 33. If now the mirror 31'' be thrown out so as to lie in the recess 2''' and the mirror 32'' be raised, the receiver 33 will be connected through tube 30'' with that part of the main tube lying to the right of the mirror 32''. Normally both mirrors 32' 32'' lie against the walls of main tube 2, thus leaving the main tube unobstructed. I have merely shown the receiver 33 in a general form, as the construction is fully shown in other figures and has been heretofore described. 43 indicates diagrammatically a structure of any description in which the receiver is mounted. It is my intention that the wires of these switches shall run to a central office, like the central office of a telephone system. A subscriber then calls up the central by any signal arrangement, who actuates the mirror-switches until connection is made between the main tubes and the proper branch tubes.

Very often it will be necessary, as it is in telephone systems, that a central house-station be used, whereby connection be made either between separate offices in a building and a main tube or between separate departments and a main office in the same building. For this purpose I may use such a switch as I have shown in Figs. 5 and 6 or the arrangement shown in Fig. 9. In this last, 35 is a cylindrical case from which project tubes 42 in all directions. The mirror 36 has a mirror-face on both sides. By rotating the mirror 36 through the handle 36'' any one of the tubes 42 may be easily connected with any other of the tubes entering the casing except the tubes diametrically opposite.

While I have shown my system of telescopic tubes and angled mirrors as applied to a building structure, it is to be understood that I design to apply it wherever it will be of service—to ships, where the revolving hood may be connected to a mast and the tube carried down to the wheel-houses or where the tube system may run from the captain's cabin or other office to all portions of the ship, thus allowing him to keep any portion of it under his inspection. It may be used in lighthouses or fire-alarm towers, in banks or saft-deposit vaults, whereby the diligence of the night watchman may be noted from a central office, and in many other ways which will develop as my system comes into general use. I intend my tubes to be run either from house to house as a private line or to main conduits, as described, and these conduits or main tubes may be carried either overground or underground, and, as I have indicated in Figs. 8ᵃ and 8ᵇ, an image may be transmitted through the air from one hood to another.

I do not wish to be limited to the identical construction shown in the drawings, either as to the size or shape of the tubes, the form of hood or receiver, or the particular switching mechanism. All these may be modified in many directions without departing from the spirit of my invention. It is also entirely within my invention if abutting tubes be set at a greater or less angle than a right angle to each other. In some cases it may be necessary that a tube be bent at various angles along its length or be curved, and I wish it understood that this is within my invention, a mirror being used at each hood, a number of them along the arc of the curve of the tube, each mirror being of course so set that the angle of reflection from it is such that the image will be carried to the next mirror around the curve of the tube.

Having described my invention, what I claim is—

1. In a building or other structure a visual transmission-tube having at one of its termini a horizontally-rotatable transmitting-mirror inclined to reflect an image into and along said tube, and at another of its termini a receiver having a mirror adapted to reflect the image transmitted through said tube to an observer, said receiver being rotatable in a horizontal plane independently of said transmitting-mirror, substantially as described.

2. In a building or other structure a visual transmission-tube having mounted upon it at one of its terminals a horizontally-rotatable hood having an opening at one side and a reflector for transmitting the image received through said opening into and along said tube, and having at another of its terminals a receiver provided with a mirror adapted to reflect the image transmitted through said tube to an observer, said receiver being rotatable in a horizontal plane independently of the said hood, substantially as described.

3. In a building or other structure, a visual transmission-tube, tubes branching therefrom in various radial directions, angularly-set mirrors at the junctions of the tubes set to reflect the image received at one tube into another, and a receiver at one of the termini of said tubes containing an angularly-set mirror on which the image transmitted through the tubes is received, said receiver being rotatable in a plane at right angles to the tube entering it and independently of said tube, substantially as described.

4. In a building or other structure a visual transmission-tube, tubes branching therefrom in various radial directions, shiftable angularly-set mirrors at the junctions of the tubes capable of being set to reflect the image received at one tube into another or to be shifted to leave the main tube clear, and a receiver at one of the termini of said tubes containing an angularly-set mirror on which the image transmitted through the tubes is received, said receiver being rotatable in a plane at right angles to the tube entering it and independently of said tube, substantially as described.

5. In a building or other structure a visual transmission-tube, tubes branching therefrom in various radial directions, shiftable angularly-set mirrors at the junctions of the tubes capable of being set to reflect the image received at one tube into the other or of being shifted to leave the main tube clear, and receivers at the termini of said tubes, each receiver being provided with an angularly-set mirror on which the image transmitted through the tubes is received, each receiver being rotatable in a plane at right angles to the tube entering it and independently of the said tube and of all the other receivers, substantially as described.

6. In a building or other structure a fixed visual transmission-tube having at one of its termini a hood rotatable independently of the tube in a horizontal plane thereon and having an opening at one side, a horizontally-pivoted mirror mounted in the said hood to reflect the image received through said hood opening into and along the said tube, means for adjusting said pivoted hood-reflector to various angles, and a receiver at the other end of said tube rotatable in a horizontal plane, substantially as described.

7. In a building or other structure a fixed visual transmission-tube, having at one of its terminals a hood rotatable in a horizontal plane independently of the tube entering it and provided with an opening at one side, a horizontally-pivoted reflector mounted in said hood to reflect the image received through said hood opening into and along said tube, a receiver at another terminal of said tube, provided with a mirror for receiving the image transmitted along said tube and transmitting it to an observer, and means mounted adjacent to the receiver for turning said hood in a horizontal plane and for changing the angle of the mirror contained in said hood, substantially as described.

8. In a building or other structure a visual transmission-tube having at one of its terminals a side opening provided with a telescope and at its other end a rotatable hood having an opening at an angle to the axis of the said tube, said hood being provided with a reflector mounted therein opposite the said opening at such angle as to transmit the image presented at said opening into the said tube, said hood being provided with a rack having a pinion meshing therewith, the shaft being provided with mechanism whereby it may be rotated, and means for controlling the rotation of said shaft, substantially as described.

9. In a system of visual transmission two or more buildings each provided with fixed visual transmission-tubes, terminal receivers visually connected with but rotatable independently around said entering-tube and provided with telescopic eyepieces, and a rotatable hood mounted on each of said tubes having an opening whose axis is at an angle to the axis of its supporting-tube, a mirror mounted within said hood to transmit the image presented at the said opening into the said tube, and means for adjusting the hoods on separate buildings so that they shall be in actual alinement with each other, substantially as described.

10. A visual transmission system for buildings or other structures comprising a fixed main tube, fixed branch tubes leading therefrom, shiftable mirrors at the junctions of the tubes for reflecting an image from one tube to another, terminal stations having receivers provided with mirrors for receiving the image projected through said tubes, said receivers having an opening at one side, telescopes mounted at the side opening so as to receive the image projected through the said tube but not entirely close said opening, and means at each terminal station for shifting the mirrors at the junctions of the tubes into or out of position to reflect the image into the branch tube opposite thereto, substantially as described.

11. In a system of visual communication a visual tube having one end adapted to receive an image, means for transmitting the image along said tube and a receiver at the other end of said tube, said receiver comprising a casing having a mirror therein and an observation-opening in its front, said mirror being so located as to receive the image from the said visual tube and transmit it through the observation-opening, and a telescope mounted to swing down into said opening but not entirely fill the same, substantially as described.

12. In a system of visual communication a visual tube having at one end a horizontally-rotatable hood, said hood having an opening at one side and a mirror so located as to transmit an image projected into said hood-opening through the said tube, the other end of said visual tube having a receiver consisting of a revoluble casing, having a side opening, a mirror located in the casing and on which the image transmitted by the tube is received and by which it is transmitted out through said opening, substantially as described.

13. In a system of visual transmission, a fixed tube along and through which the image is projected, and a receiver into which the said tube projects, said receiver comprising a casing having an opening at one side, an angularly-set mirror for reflecting the image received in said casing out through said opening, a telescope mounted on said casing, to be shifted over a portion of said opening, and a speaking-tube entering said casing, the casing being rotatably mounted on a standard, substantially as described.

14. In a system of visual communication a main tube and a branch tube, the main tube having a recess therein opposite the opening of the branch tube, a mirror pivoted at one end in said recess and free to be turned on its pivot to be set at an angle across said main tube, an armature connected to said mirror, and an electromagnet designed to attract said armature to move the mirror to such position as to reflect an image projected through the main tube into the branch tube or to move it into the said recess and leave the main tube clear, and electrical connections from said magnet to a terminal station from which the said switching-mirror may be connected, substantially as described.

15. In a system of visual communication, a main tube and branch tube, a mirror pivoted to the wall of said main tube opposite the opening of the branch tube, an arm projecting from said mirror, a lever pivoted to said arm and to a fixed bearing, an armature on said lever, an electromagnet mounted adjacent to said armature and adapted to attract the same and thus move the lever, and means for turning the lever to its normal position when the said magnet is unelectrified, substantially as described.

16. In a system of visual transmission a receiving-tube having a receiver for receiving the image transmitted along said receiving-tube, a main tube into which the receiving-tube opens, running in opposite directions past the receiving-tube, in combination with shiftable mirrors at the junction of the receiving-tube with the main tube adapted to reflect the image received from either direction entering said main tube into the receiving-tube and mechanism for shifting said mirrors either into position to so reflect or out of position to leave the main tube clear, substantially as described.

17. In a system of transmitting visual images from or to a branch tube in either direction along a main tube; a main tube and a branch tube, a connection between the main tube and the branch tube comprising two parallel tubes one of which is continuous with the branch tube; a transverse connecting-tube between the parallel tubes at their upper ends; pivoted mirrors in the main tube opposite the entrances of the said branch connections, each mirror reflecting in opposite directions, each adapted to be independently operated, and each when raised transverse to the main tube adapted to reflect into the openings of their respective branch connections; an angularly-set mirror at the junction of one of the branch connections with the transverse connecting-tube; and a pivoted mirror in the other branch connecting-tube adapted, when it is transverse to said last-named tube, to receive the image transmitted from said mirror at the head of the other branch connecting-tube, and to transmit it into said branch tube, substantially as described.

18. A central-office switch for a system of visual transmission-tubes, same comprising a casing into which a number of said visual tubes are received, said casing having a main side opening and a shiftable mirror in said casing adapted to be moved so as to reflect an image projected from any one of the tubes into the said main side opening, substantially as described.

19. A central-office switch for a system of visual tubes; the same comprising a circular casing from which a number of said visual tubes radiate, a mirror pivoted to turn in a plane parallel to said radiating tubes and inclosed within the said casing and means for turning said mirror whereby any one of the said tubes may be placed in visual connection with another of the said tubes, substantially as described.

20. In a system of visual transmission between two separate stations, a visual transmission-tube having at one of its terminals a rotatable hood provided with a mirror above the said tube pivoted at the rear edge thereof, means for adjusting the mirror to any inclination desired, another terminal of said tube being provided with a receiver having a mirror for reflecting the image transmitted along said tube to an observer, substantially as described.

In testimony whereof I have signed my name to this specification, in the presence of two subscribing witnesses, this 9th day of May, 1905.

DANA DUDLEY.

Witnesses:
FREDERIC S. HARTSHORNE,
RICHARD BRITTEN.